US008098147B2

(12) United States Patent
Fu

(10) Patent No.: US 8,098,147 B2
(45) Date of Patent: Jan. 17, 2012

(54) SYSTEM FOR MONITORING THE TIRE

(75) Inventor: Jianzhong Fu, Gullin (CN)

(73) Assignee: Zhejiang Geely Holding Group Co., Ltd. (CN)

(*) Notice: Subject to any disclaimer, the term of this patent is extended or adjusted under 35 U.S.C. 154(b) by 504 days.

(21) Appl. No.: 11/919,590

(22) PCT Filed: Jun. 9, 2006

(86) PCT No.: PCT/CN2006/001259
§ 371 (c)(1),
(2), (4) Date: Aug. 20, 2008

(87) PCT Pub. No.: WO2006/131078
PCT Pub. Date: Dec. 14, 2006

(65) Prior Publication Data
US 2009/0045930 A1 Feb. 19, 2009

(30) Foreign Application Priority Data

Jun. 9, 2005 (CN) .......................... 2005 1 0078211

(51) Int. Cl.
*B60C 23/00* (2006.01)
(52) U.S. Cl. ........................................ 340/445; 340/447
(58) Field of Classification Search ........... 340/442–447
See application file for complete search history.

(56) References Cited

U.S. PATENT DOCUMENTS

| | | | |
|---|---|---|---|
| 6,215,393 | B1 | 4/2001 | Delaporte |
| 6,278,363 | B1 | 8/2001 | Bezek et al. |
| 6,448,892 | B1 | 9/2002 | Delaporte |
| 6,463,798 | B2 * | 10/2002 | Niekerk et al. ............... 340/442 |
| 6,507,276 | B1 | 1/2003 | Young et al. |
| 6,535,116 | B1 | 3/2003 | Zhou |

(Continued)

FOREIGN PATENT DOCUMENTS

CN 1132702 10/1996

(Continued)

OTHER PUBLICATIONS

International Search Report from PCT/CN2006/001259, mailed Oct. 19, 2006.

(Continued)

*Primary Examiner* — Thomas J Mullen
(74) *Attorney, Agent, or Firm* — Calfee, Halter & Griswold, LLP

(57) ABSTRACT

This invention provides a tire monitoring system, comprising a remote tire monitoring unit installed in the tire, a central controller, a speech indicating unit and a brake deceleration mechanism; wherein the remote tire monitoring unit is used to monitor and sample the pressure and temperature within the tire, and generate the sampling data signals of tire conditions which are subsequently wirelessly transmitted to the central controller; the central controller wirelessly receives sampling data signals of tire conditions, and calculates received data signals so as to generate speech indicating command and/or brake deceleration command, and afterward conveys the speech indicating command to the speech indicating unit, while the brake deceleration command to the brake deceleration mechanism; a speech indication unit, provided to receive said speech indication command and output the speech indication information; and a brake deceleration mechanism, provided to receive said brake deceleration command and performs action of brake deceleration so as to provide effective security protection when quick deflation and tire burst suddenly occur in a short time.

9 Claims, 2 Drawing Sheets

U.S. PATENT DOCUMENTS

2004/0021560 A1 *  2/2004  Sasaki et al. .................. 340/445

FOREIGN PATENT DOCUMENTS

| CN | 1270895 | 10/2000 |
| CN | 1472085 | 9/2002 |
| CN | 1142073 | 3/2004 |
| CN | 1613674 | 5/2005 |
| GB | 2372861 | 9/2002 |
| JP | 8016954 | 1/1996 |
| JP | 9503971 | 4/1997 |
| JP | 9240446 | 9/1997 |
| JP | 2003306016 | 10/2003 |
| JP | 2004512214 | 4/2004 |
| JP | 2004-322927 | 11/2004 |
| JP | 2005047460 | 2/2005 |
| KR | 20050014751 | 2/2005 |
| WO | 96/15919 | 5/1996 |

OTHER PUBLICATIONS

Written Opinion from PCT/CN2006/01259, mailed Oct. 19, 2006.
International Preliminary Report on Patentability, mailed Dec. 11, 2007.

* cited by examiner

SYSTEM FOR MONITORING THE TIRE

CROSS REFERENCE TO RELATED APPLICATIONS

The present application is the U.S. national phase entry of PCT/CN2006/001259 with an international filing date of Jun. 9, 2006 and claims priority from CN Patent Application Serial No. 200510078211.8, filed Jun. 9, 2005, which are both incorporated by reference in their entirety.

TECHNICAL FIELD

This application relates to a technical field concerning vehicle-driving safety and, particularly relates to technologies concerning tire pressure, temperature monitoring and driving control and, specifically relates to a tire monitoring system.

BACKGROUND ART

The influence of tires on vehicle-driving safety has been the focus of the vehicle field and the public. Since the Tire Pressure Monitoring System (abbreviated to TPMS) became required to be included in the standard configuration of vehicles in the United States in 2003. TPMS has become a technical term with respect to the vehicle technology, and worldwide research, development and manufacturing of TPMS is rapidly increasing.

Referring to FIG. 1, the mainstream technical solutions of prior art TPMS 100 are: TPMS comprises two parts; remote tire pressure monitoring modules (abbreviated to RTPM) 1 installed within tires of a vehicle, and a central monitor 2 that includes an LCD display 150 installed in the driving cabin of a vehicle. Power is supplied by lithium thionyl chloride battery. The RTPM installed within each tire monitors and samples tire pressure and temperature therein, and transmits sampling data via high frequency radio wave (RF). Four or five (including spare tires) RTPM modules are included in one TPMS. The central monitor receives signals transmitted from the RTPM module and displays, in sequence, the data of pressure and temperature within each tire on the liquid crystal display panel for driver's reference. If abnormalities in tire pressure or temperature occur, the central monitor will generate different alerting signals to warn the driver to take necessary measures. The typical technical route or principle block diagram thereof is shown in FIG. 1, wherein, The RTPM module 1 comprises a plurality of composite parts: 1) an intelligent sensor 102 having pressure, temperature, acceleration, voltage detecting, and post-signal processing ASIC chip assembly; 2) a 4-8 bits micro-computer control unit (MCU) 104; 3) a radio frequency transmission chip 106; 4) a lithium thionyl chloride battery 108; and 5) antennas 110.

The intelligent sensor 102, a system-on-chip module made by the technique of silicon micro-electro-mechanical system (MEMS) comprises a pressure sensor, a temperature sensor, an accelerometer, battery voltage detecting, an internal clock, and a digital signal processing ASIC unit having an analog-to-digital converter (ADC), sampling/holding (S/H), SPI ports, calibration, data management and ID code. The module is provided with mask programmability, which means that customers can use special software to configure the module.

The prior art TPMS technique supplies power for RTPM with lithium thionyl chloride battery, wherein as the RTPM is limited by battery capacity, the minimum power design of battery management adopts the solution of after-sampling dormancy and timing wake-up to meet the requirement that the service life of battery can last for 5~10 years. In the manner of TPMS, pressure data, temperature data and the like are sampled at long intervals, in general, the sampling frequency of the pressure data is 1/3 Hz~1/8 Hz and the data transmitting frequency is 1/30 Hz~1/80 Hz, accurately controlled by the power management program of RTPM microprocessor. The interval of RTPM timing wakeup of RTPM is regularly set between the range of 3~8 s. The RTPM module is in a state of dormancy during sampling intervals.

TPMS has a positive effect on keeping the tire in normal pressure, preventing and reducing accidents caused by tire bursts. However, as the sampling interval of the tire pressure data in the prior art TPMS system is as much as 3000~8000 ms, thus there are certain limitations or deficiencies, wherein the system only has the function of indicating information of tire pressure and temperature, and the role the function plays is confined to warning and preventing, but cannot make a prompt response to tire burst or quick deflation and cannot provide effective help, which are features of the current TPMS technique. Strictly speaking, the prior art TPMS should be defined as an information indicating and warning system.

Relevant research materials show that a tire burst occurs suddenly, without any evident or definite signs beforehand, so that it cannot be avoided once and for all. The reasons for triggering a tire burst lie in that: the rising pressure and temperature within the tire, especially the friction inside the tire (between the rubber and the steel casing ply) induced by tire pressure that is too low leads to part of the rubber layer of the tire rising to a high temperature, Then the rubber and the casing ply begin stripping and embrittling, and finally brings on tire burst. Tire pressures that are too low and longtime high speed driving are significant inducements to tire burst.

The research report "3-Dimensional Simulation of Vehicle Response to Tire Blow-outs" published by Wesley D. Grimes—an American Scholar—shows that when a tire burst happens, the pressure within the tire is lost within 100 ms, thereby the rolling radius of the burst tire diminishes, and the rolling resistance increases to 30 times more than before bursting. The positive pressure Fz to the ground brought by the wheel with a burst tire and the wheel, that is diagonal to the wheel with the burst tire with the lateral friction subsequently declining. The process continues and thus the rim begins to roll the tire until the tire is torn and separated from the rim, so that the lateral friction drops rapidly. During the tire being rolled and torn, the rapid increase of rolling resistance between the tire and the ground causes the wheel to convert from rolling to sliding (when the wheel with a burst tire is a driven wheel), so that a lateral force is formed which impels the vehicle to move in a deviated driving direction.

Wesley D. Grimes' research report also shows that a simple tire burst will not inevitably cause an accident. Whether the driver makes an appropriate response to tire burst information or not and the specific conditions of the road where the vehicle is when a tire burst happens are directly linked to the occurrence of traffic accidents. In particular, over-steering and over-braking (brake dragging) will be likely to induce accidents. On the contrary, proper operation and control (adjusting and maintaining the driving path and braking moderately) will be likely to prevent accidents from happening.

The conclusion of the research report discloses an extremely significant fact: in the 2-3 seconds time from the tire burst occurrence, the driver is able to make a response. This response by the driver on the vehicle is considered to be necessary and indispensable, and plays a significant role in obviating the danger of tire burst.

SUMMARY

The object of this invention is to provide a tire monitoring system, wherein TPMS information warning systems are improved and expanded into the information warning and automated driving control system, so as to become an active driving safety security system.

The technical solutions of this invention lie in that: a tire monitoring system comprises: a remote tire monitoring unit disposed within a tire, a central controller, a speech indicating unit and a brake deceleration mechanism; wherein The remote tire monitoring unit monitors and samples tire pressure at a sampling frequency of 5 Hz~20 Hz, and wirelessly transmits the sampling data packet signals to the central controller;

The central controller wirelessly receives the sampling data packet signals of tire conditions, and processes the received data packet signals by decoding and calculating so as to generate the speech indicating command and/or brake deceleration command, and then sends the speech indicating signals to the speech indicating unit while the brake deceleration command is sent to the brake deceleration mechanism;

The speech indicating unit is used to receive the speech indicating command and output the speech indication information;

The brake deceleration mechanism is used to receive the brake deceleration command and perform the brake deceleration action.

The system is characterized in that the remote tire monitoring unit comprises; a sensor used to monitor and sample tire conditions and output the sampled data signals; a signal processing unit, used to receive and process the sampled data signals and output the data packet signals of tire conditions; a radio-frequency transmission unit, used to transmit the tire condition data packet signals; and a timing wake-up circuit unit, used to keep the sensor, the processing unit and the radio-frequency transmission unit dormant during the sampling intervals so that the battery energy consumed by the remote tire monitoring unit can be reduced.

The system is characterized in that the wake-up interval of the timing wake-up circuit unit is 50~200 ms.

The system is characterized in that the adopted transmission frequency is 315 MHz or 433 MHz or 866 MHz or other micro-wave bands licensed for civilian use.

The system is characterized in that said sensor comprises a pressure sensor and/or a temperature sensor.

The system is characterized in that the central controller comprises:

A frequency-receiving unit used to receive data packet signals of tire conditions;

A signal processing control unit used to process received data packet signals of tire conditions by decoding and calculating so as to generate tire condition data, and then compare said tire condition data with a preset threshold value range of tire conditions; if said tire condition data fall into the preset range of threshold value, said speech indicating command and/or brake deceleration command will be output.

The system is characterized in that the tire condition data comprises: tire burst or quick deflation data; serious air shortage data; air shortage data; normal pressure data and overpressure data, The preset threshold value range of tire conditions indicates:

Range of tire burst or quick deflation<30% of the normal pressure value of a tire;

30% of the normal pressure value of a tire<range of serious air shortage<60% of the normal pressure value of a tire;

60% of the normal pressure value of a tire<range of air shortage<80% of the normal pressure value of a tire;

80% of the normal pressure value of a tire<range of normal air pressure<120% of the normal pressure value of a tire;

Range of overpressure>120% of the normal pressure value of a tire;

If the tire condition sampling data falls in the range of ">30% of the normal pressure value of a tire", only speech indicating command will be output. After receiving the speech indicating command, said speech indicating unit outputs the corresponding speech indication information at a preset indicating frequency;

If the tire condition sampling data falls in the range of "<30% of the normal pressure value of a tire", speech indicating command and brake deceleration command will be output;

The system is characterized in that the signal processing control unit is provided with a following function that the brake deceleration command performs following the burst tire pressure sampling data signals. That is to say, the interruption of sampling data of tire burst or quick deflation will bring the interruption of the brake deceleration command.

The system is characterized in that, the speech indicating unit comprises a speech synthesizing circuit receiving speech indicating command transmitted from the central controller and generates speech alerting indication with the prerecorded and stored speech synthesis.

This invention is effective in the following aspects;

1. The replacement of the LCD real-time information display with the speech indication alarm releases driver's load of information quantity, which plays a positive role in driving safety;

2. The speech indication can be performed at a proper frequency. With respect to the conditions like tire air shortage, overpressure and over high temperature, except tire burst or quick deflation, the speech indicating frequency can be set between 1/60 Hz~1/600 Hz so as to reduce the disturbance on the driver from the alerting information;

3. On the basis of the function of monitoring tire pressure, this invention can provide effective security protection as to quick deflation and tire burst in a short period. In particular, this invention can make up the limitation of the brake reaction time, which plays an extremely important role in obviating the risk of tire burst. This function possesses creative improvement and substantive progress compared with functions of the current TPMS.

The technical solution of this invention maintains and further improves the function of monitoring TPMS tire pressure and can perform active rescue after tire burst as well. Therefore, it is a comprehensive system with a combining function of preventing and rescuing and thus belongs to an active driving safety securing system.

DETAILED DESCRIPTION OF THE PREFERRED EMBODIMENTS

Detailed embodiments of the technical solutions of this invention will be explained as follows with reference to the drawings.

The technical solutions of this invention are as follows: a tire monitoring system comprises: a remote tire monitoring unit (RTM), a central controller, a speech indicating unit and a brake deceleration mechanism; wherein The remote tire monitoring unit monitors and samples tire pressure at a sampling frequency of 5 Hz~20 Hz and wirelessly transmits the sampled data packet signals to the central controller;

The central controller wirelessly receives sampled data packet signals of tire conditions, and then processes the data packet signals by decoding and calculating so as to generate speech indicating command and/or brake deceleration command, and subsequently sends the speech indicating command to said speech indicating unit while the brake deceleration command is sent to said brake deceleration mechanism;

The speech indicating unit is used to receive the speech indicating command and output speech indication information;

The brake deceleration mechanism is used to receive the brake deceleration command and perform brake deceleration action.

The remote tire monitoring unit according to this invention, comprises; a sensor used to monitor and sample tire conditions and output the sampled data signals; a signal processing unit, used to receive and process the sampled data signals and output the data packet signals of tire conditions; a radio-frequency transmission unit, used to transmit the data packet signals of tire conditions; a timing wake-up circuit unit, used to keep the sensor, the processing unit and the radio-frequency transmission unit dormant during the sampling intervals so that the battery energy consumed by the remote tire monitoring unit can be reduced.

According to said system, the adopted radio-frequency is microwave 315 MHz or 433 MHz or 866 MHz or other microwave bands licensed for civilian use.

Figure 1:
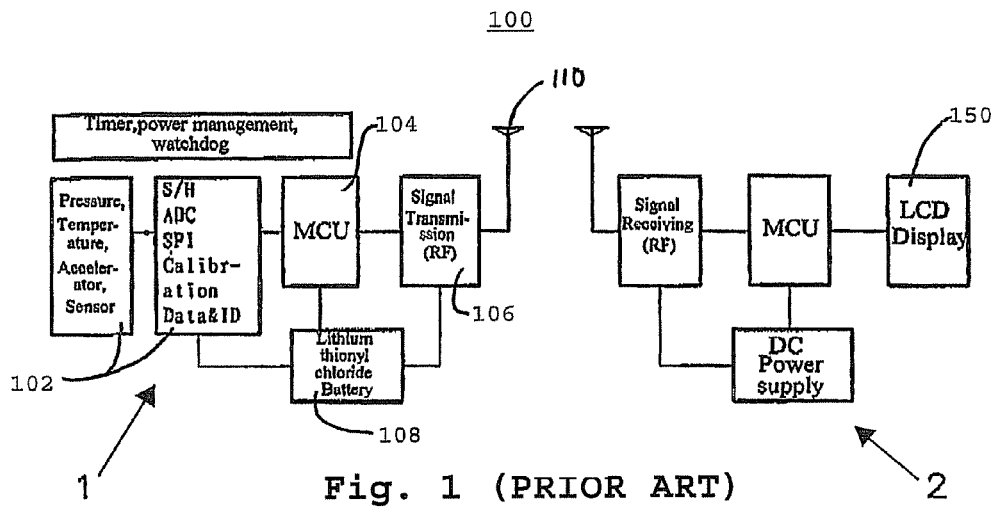
FIG. 1 is a block diagram of a prior art TPMS.
Figure 2:
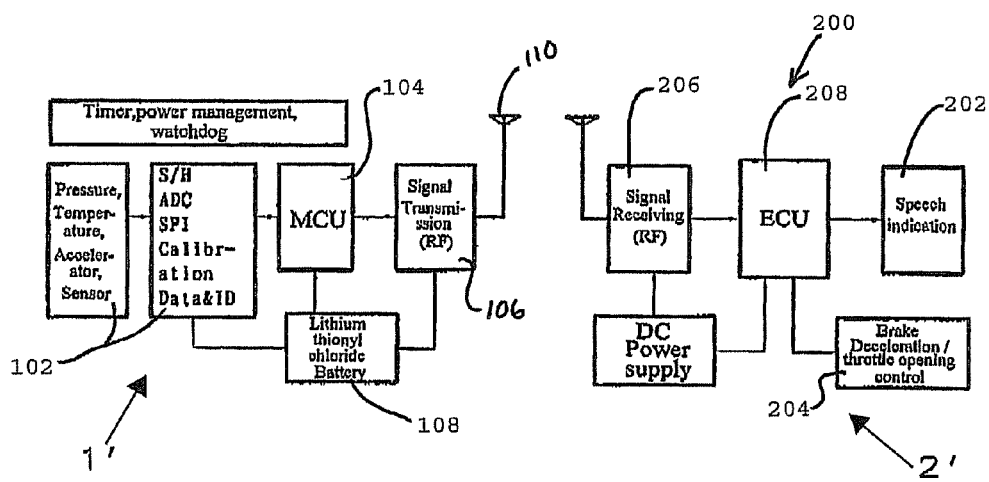
FIG. 2 is a block diagram of the technical solutions of this invention.

As shown in FIG. 2, compared with the technical solutions of the prior art TPMS of FIG. 1, the technical solutions of this invention retain the basis of the TPMS technical solutions in the aspect of remote tire monitoring unit 1'. Based on TPMS, the technical solutions of this invention keep the pressure information warning and indicating function of the prior art, append the driving disturbance control function of the present invention, and thereby the functionality of the central monitor 2 is expanded to that of a central controller 2' of the present invention. The rising tire pressure sampling frequency enables the tire remote monitoring unit to timely sample and transmit the emergency signals like tire burst or quick deflation. After receiving tire burst signal data, the central controller promptly sends control command out to drive the driving interference mechanism 204 to perform actions of brake decelerating and narrowing throttle opening, and thereby to slow down and further to obviate the risk of tire burst.

This invention makes creative improvements in the aspects of tire pressure sampling frequency and timing wakeup circuit. When emergencies like tire burst occur, the pressure within the tire is completely lost within about 100 ms, to which the monitoring and sampling frequency of the pressure sensor is required to adapt by raising the current sampling frequency 1/3 Hz~1/8 Hz of TPMS to 10 Hz in order to guarantee the timely sampling of the tire burst signals which will be lost within about 100 ms. In general, 10 Hz is the baseline of the sampling frequency. However, it is still rational and proper to appropriately reduce reaction time in order to prolong the service life of the battery. For instance, in this invention, the sampling frequency of the remote tire monitoring unit 1' (as shown in FIG. 2) is set in the range of 5~20 Hz. Sampling frequency that is too low cannot guarantee timely sampling of burst tire pressure signals while sampling frequency that is too high will consume more power uselessly and thus shorten the service life of battery. Therefore, for instance, in this exemplary embodiment, the sampling frequency can be set as 10 Hz to guarantee the timely sampling tire pressure data in emergencies like tire burst.

Particularly, to reduce battery energy consumed by the remote tire pressure monitoring module, technical solutions of the TPMS adopts a work pattern that the remote tire monitoring unit is kept in dormancy during sampling intervals and is waken up in a manner of timing wakeup. However, the fact that the current TPMS remote module presets one wakeup after a regular time of 3~8 s evidently cannot accommodate to the work pattern at a high sampling frequency. The exemplary embodiments of this invention improve the interval of wakeup time to within the range of 50~200 ms. For instance, the interval of wakeup time can be set as 100 ms to achieve the aim that the module is in dormancy in a sampling interval at a sampling frequency of 10 Hz, so that the requirement of power saving at a high sampling frequency can be fulfilled.

Besides the remote tire monitoring unit 1', the tire monitoring system of this invention also comprises: a central controller 200, a speech indicating unit 202 and a brake deceleration mechanism 204. The central controller comprises: a radio-frequency unit 206 provided to receive the tire condition data packet signals; a signal processing control unit 208 provided to decode and calculate the received tire condition data packet signal so as to generate tire condition data which are then compared with a preset threshold value range of tire conditions. If the tire condition data fall into the range, the speech indicating command and/or brake deceleration command are/is output. The tire condition data include: tire burst or quick deflation data; serious air shortage data; air shortage data, normal pressure data and overpressure data.

The preset threshold value range of tire conditions indicates:

Range of tire burst or quick deflation<30% of the normal pressure value of a tire; 30% of the normal pressure value of a tire<range of serious air shortage 60% of the normal pressure value of a tire; 60% of the normal pressure value tire<range of air shortage<80% of the normal pressure value of a tire; 80% of the normal pressure value of a tire<range of normal air pressure<120% of the normal pressure value of a tire; range of overpressure>120% of the normal pressure of a tire;

If the tire condition sampling data falls into the range of ">30% of the normal pressure value of a tire" (data within said range are called "warning data"), only the speech indicating command will be output. After receiving said speech indicating command, the speech indicating unit outputs the corresponding speech indication information at a preset speech indicating frequency;

If tire condition sampling data falls into the range of "<30% of the normal pressure value of a tire" (data within this range are called "control data"), speech indicating command and brake deceleration command will be output.

As the current remote tire pressure monitoring modules of TPMS are manufactured by several large professional companies, the running program (or specific function index) is separately programmed or designed. Therefore, in this invention, the pressure abnormal feature points in the running program are designed according to the aforementioned preset threshold value ranges of tire conditions, wherein the central controller unit (ECU) analyzes and processes received pressure data, and classifies the data according to the threshold value. In addition, the division of pressure areas can be adjusted depending on different vehicle types and different tire pressures. If the pressure warning range needs to be more accurate, the pressure range can be classified into more groups and more specifically.

The speech interval indication driving function is realized directly by ECU which calculates and identifies received pressure sampling data information. When the condition of information indication is formed, ECU generates driving signals to the speech synthesized circuit according to a regular time interval; the speech synthesized circuit records and stores the corresponding speech synthesis in advance, and generates speech altering indications following the driving command.

The technical solutions of this invention adopt the manner of speech indication to replace LCD display, which not only avoids disturbance on driving safety from excessive information, but also reduces the difficulty in mounting the product. The central controller is mounted in an appropriate concealment in the vehicle without causing any negative influence on the interior decoration.

The signal processing control unit of the central controller is provided with a following function that the brake deceleration command performs following the pressure sampling data signals of a burst tire. That is to say, the interruption of the sampling data of tire burst or quick deflation will bring on the interruption of the brake deceleration command.

The realization of the brake deceleration function in a state of autocontrol should take into consideration false triggering caused by signal disturbance, which should gain special attention when the technical solution of wireless signal transmission is adopted. In practice, as vehicles can be driven in any traffic conditions, the direct consequence of signal disturbance is the consequence caused by false brake brought by false operation on the autocontrol system. Therefore, it is a must to consider or prevent the occurrence of the conditions that are likely to be caused and to suppress the damage of the conditions. In this invention, a special signal disturbance false triggering suppressing program is designed, i.e. the brake deceleration command performs following the sampling data of burst tire pressure. That is to say, the interruption of sampling data of the burst tire pressure will bring on the interruption of the brake deceleration command of the central controller unit (ECU). Therefore, even if one or two disturbing signals cause false brake of the system, due to the incontinuity or irregularity of disturbance signals, ECU is able to make quick recognition so as to suppress or obviate the damage induced by false brake and thereby to obviate harmfulness caused by continuous false brake.

In the technical solutions of this invention, the brake enforcing mechanism of the automated brake deceleration function, can be realized through adopting the current technology of automated deceleration mechanism, such as the automated brake deceleration mechanism of the automobile rear-end collision system. Moreover, the automated deceleration can be realized by providing a special brake deceleration mechanism having brake power storage, such as the brake deceleration mechanism disclosed in CN ZL00101579.6.

The speech indication unit of this invention comprises a speech synthesis circuit receiving the speech indication command from the ECU and generating speech alerting indications with prerecorded and stored speech synthesis.

In the pressure sampling data in the embodiments of this invention, the sending frequency of the warning data (>30% P, P is the normal pressure value of a tire) is set at 1160 Hz, while the sending frequency of the control data (<30% P) is set to be an extremely small interval or consecutively sent with a period lasting for 10 s.

Figure 3:
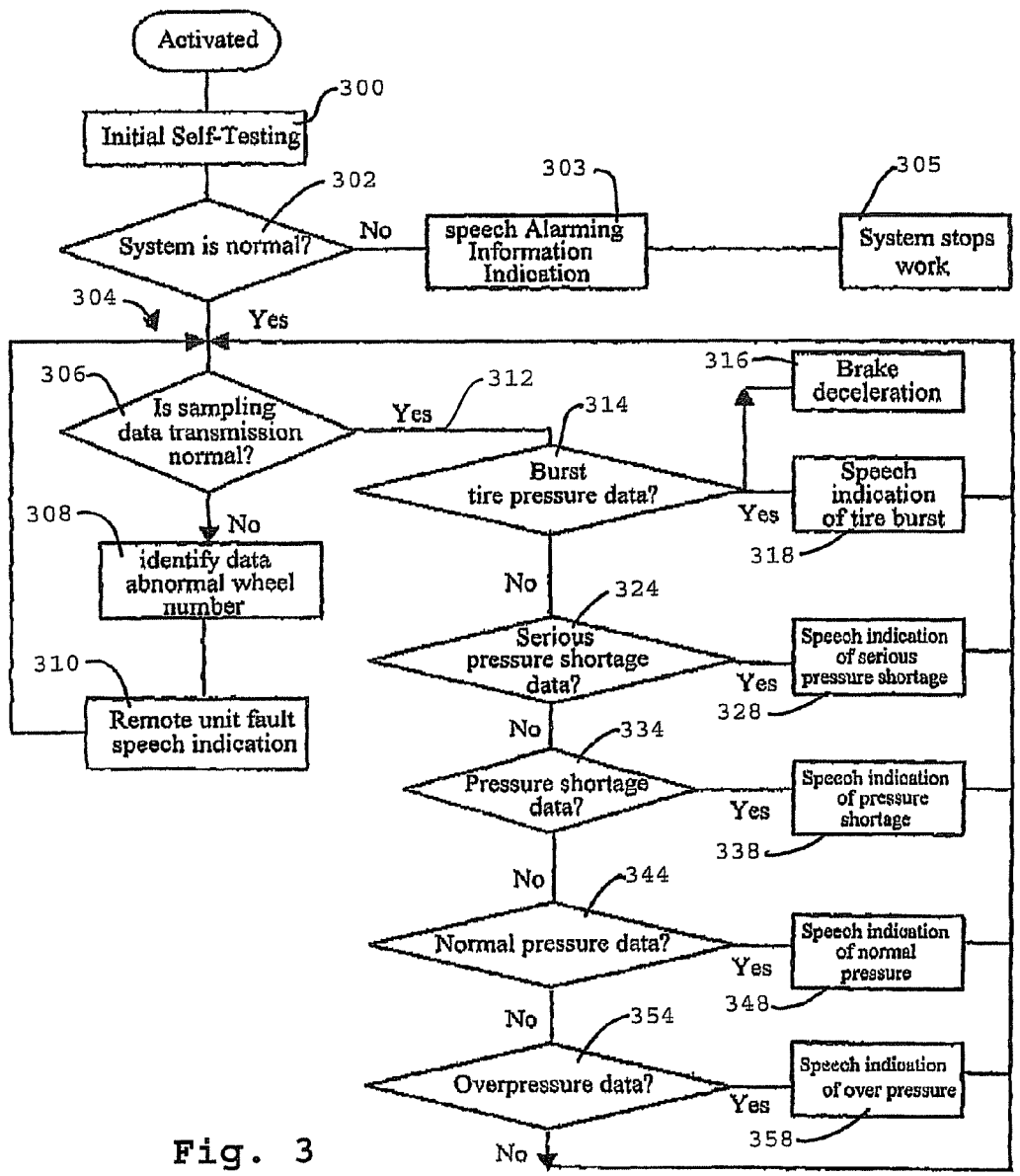
FIG. 3 is a flow chart of the control process of the technical solutions of this invention.

The flow chart of the system control process of this invention is shown in FIG. 3. After being activated, the system first implements 300 the self-testing program to ensure 302 that the system is in a normal work condition. If the system is not normal, a speech alarm is provided 303 and the system stops work 305. Once the self-testing program ensures that the system is in a normal work condition the program of analyzing and processing 304 received data is entered. If abnormalities occur during data transmission 306, the system identifies 308 the number of the abnormal tire position via the remote monitoring module and generates speech indications 310; if data transmission is normal 312, the following steps will be implemented:

At step 314, when pressure sampling data received by ECU falls into the range of "<30% P" (within the range of tire burst or quick deflation), ECU performs 316 driving interference control measures, including brake deceleration and narrowing the throttle opening, and generates 318 speech indication as well;

At step 314, when sampling data received by ECU fall into the range of ">30% P and <60% P" (within the range of serious pressure shortage), the ECU generates 328 the speech indication of serious pressure shortage at a frequency of 1/60 Hz;

At step 334, when sampling data received by ECU fall into the range of ">60% P and <80% P" (within the range of pressure shortage), the ECU generates 338 the speech indication of pressure shortage at a frequency of 1/600 Hz;

At step 344, when sampling data received by ECU fall into the range of ">80% P and <120% P" (within the range of normal pressure), the ECU generates 348 the speech indication of normal pressure at a frequency of 1/3600 Hz;

At step 354, when sampling data received by ECU fall into the range of ">120% P" (within the range of overpressure), the ECU generates 358 the speech indication of overpressure at a frequency of 1/600 Hz.

The above specific embodiments are used only to illustrate this invention, not to limit this invention.

The invention claimed is:

1. A tire monitoring system comprises:
   a remote tire monitoring unit provided within a tire;
   a central controller;
   a speech indicating unit; and
   a brake deceleration mechanism;
   wherein, said remote tire monitoring unit monitors and samples tire pressure at a sampling frequency of 5 Hz~20 Hz, and wirelessly transmits tire condition signals to said central controller;
   said central controller wirelessly receives said tire condition signals, then processes said tire condition signals so as to generate a speech indicating command and/or a brake deceleration command, and subsequently transmits the speech indicating command to the speech indicating unit, and the brake deceleration command to the brake deceleration mechanism;
   said speech indicating unit receives said speech indicating command and outputs speech indication information; and
   said brake deceleration mechanism receives said brake deceleration command and performs a brake deceleration action.

2. The system according to claim 1, characterized in that said remote tire monitoring unit comprises:
- a sensor used to monitor and sample tire conditions and output said tire condition signals;
- a signal processing unit used to receive and process said tire condition signals and output packets of said tire condition signals;
- a radio-frequency transmission unit used to transmit said packets of tire condition signals;
- a timing wakeup circuit unit used to keep dormant the sensor, said signal processing unit and said radio-frequency unit during sampling intervals so as to reduce battery energy consumed by the remote tire monitoring unit.

3. The system according to claim 2, characterized in that the wakeup interval of said timing wakeup circuit unit is 50~200 ms.

4. The system according to claim 2, characterized in that the radio-frequency transmission unit transmits at a frequency of 315 MHz or 433 MHz or 866 MHz.

5. The system according to claim 2, characterized in that said sensor comprises a pressure sensor and/or a temperature sensor.

6. The system according to claim 1, characterized in that said central controller comprises:
- a radio-frequency unit, used to receive said tire condition signals;
- a signal processing control unit, used to process received tire condition signals to generate tire condition data values which are then compared with a range of preset tire condition threshold values, wherein if said tire condition data value is in said range of preset tire condition threshold values, the speech indicating command and/or brake deceleration command is transmitted by the signal processing control unit.

7. The system according to claim 6, characterized in that said tire condition signals comprise:
- tire burst data;
- air shortage data;
- normal pressure data; and
- overpressure data;

wherein said range of preset tire condition threshold values comprises:
- a range of values indicating tire burst that is:
  - less than or equal to 30% of the normal pressure value of the tire;
- a range of values indicating air shortage that is:
  - greater than 30% of the normal pressure value of the tire; and
  - less than 80% of the normal pressure value of the tire;
- a range of values indicating normal pressure that is:
  - greater than 80% of the normal pressure value of the tire; and
  - less than 120% of the normal pressure value of the tire;
- a range of values indicating overpressure that is:
  - greater than 120% of the normal pressure of the tire; wherein
- if the tire condition data values are in the range of >30% of the normal pressure value of the tire, only the speech indicating command will be generated;
- wherein after receiving said speech indicating command, the speech indicating unit outputs said speech indication information at a preset indicating frequency;
- wherein if tire condition data values are in the range of <30% of the normal pressure value of the tire, both a speech indicating command and a brake deceleration command will be generated.

8. The system according to claim 7, characterized in that if said signal processing control unit is provided with a tire condition data value that is greater than said range of values indicating tire burst, said signal processing control unit interrupts any previous brake deceleration commands.

9. The system according to claim 1, characterized in that said speech indicating unit comprises a speech synthesis circuit provided to receive the speech indicating command transmitted from said central controller, and then generate speech indication information with prerecorded and stored speech synthesis.

* * * * *